United States Patent [19]

Komninos

[11] Patent Number: 5,103,675

[45] Date of Patent: Apr. 14, 1992

[54] SIGNAL DETECTOR AND METHOD FOR DETECTING SIGNALS HAVING SELECTED FREQUENCY CHARACTERISTICS

[76] Inventor: Nikolaos I. Komninos, 2802-B W. Long Dr., Littleton, Colo. 80120

[21] Appl. No.: 453,688

[22] Filed: Dec. 20, 1989

[51] Int. Cl.$^5$ ............................................ G01M 3/24
[52] U.S. Cl. ................................. 73/592; 73/40.5 A; 381/98
[58] Field of Search ................. 73/592, 602, 587, 645, 73/646, 647, 648, 40.5 A; 367/135; 381/29, 104, 106, 98; 328/22, 25

[56] References Cited

U.S. PATENT DOCUMENTS

| | | | |
|---|---|---|---|
| 3,500,676 | 3/1970 | Palmer | 73/40.5 A |
| 3,784,754 | 1/1974 | Hagiwara et al. | 381/30 |
| 4,130,734 | 12/1978 | Lee | 381/29 |
| 4,461,022 | 7/1984 | Slagley | 381/29 |

*Primary Examiner*—John E. Chapman
*Attorney, Agent, or Firm*—Timothy J. Martin

[57] ABSTRACT

A signal detector and signal detection methodology is provided to monitor oscillatory signals, such as sound signals, to produce detector output in response to the presence of target signals having a frequency within a selected frequency range, such as ultrasonic sound signals. The detector has input processing circuitry that receives the oscillatory signals and filters out those which do not fall within the selected frequency range to produce an input signal. The input signal is split into two components, a primary input component and a control component. The primary input component is amplified proportionally to the amplitude of the control component. Preferably, the primary input component is processed to produce a clean, stable intermediate signal. Here, the signal detector provides processing circuitry that passes primary input components that have amplitudes exceeding a threshold, to eliminate low level noise; the primary input components are variably amplified inversely to the amplitude thereof to produce an initial intermediate signal having a substantially uniform amplitude at the frequency of the input signal. This initial intermediate signal is processed by a Schmitt-Trigger to create a square-wave signal. The processing circuit includes a scaler sub-circuit to divide the square-wave signal by an integer, and an integrating sub-circuit integrates the resulting scaled signal to produce the intermediate signal. An amplification circuit has variable gain controlled by averaging the amplitude of the input signal by way of the control component so that the intermediate signal is amplified according to the original amplitude to produce a scaled replica of the filtered input signal. Sensitivity adjustment and visual and audible displays are used for the detector output.

22 Claims, 9 Drawing Sheets

SIGNAL DETECTOR AND METHOD FOR DETECTING SIGNALS HAVING SELECTED FREQUENCY CHARACTERISTICS

FIELD OF INVENTION

The present invention generally relates to procedures and apparatus for monitoring incoming signals to detect the presence of selected target signals contained within the universe of signals received. More specifically, however, the present invention is directed to monitoring ambient audio signals to detect selected ultrasonic signals in an ambient environment. Thus, the present invention is even more specifically directed to ultrasonic leak detectors and the methods for detecting ultrasonic signals generated by the passage of pressurized gas through small openings.

BACKGROUND OF THE INVENTION

A variety of different signal detectors have been developed in the past, and, indeed, many electronic circuits include tuning circuitry adapted to receive, filter and process signals within a selected frequency range. With respect to signal detectors constructed specifically to monitor a broad range of oscillatory signals, certain problems arise where those circuits seek signals having certain selected frequency characteristics. For example, many of the existing detectors exhibit a high susceptibility to noise and produce faulty readings where random noise signals fall within the target frequency range. Further, these systems often encounter problems with signal to noise ratio for the target signals versus the background noise. In order to solve these problems, many existing signal detectors resort to superheterodyning in order to increase sensitivity, eliminate noise and shift frequency bands.

As noted above, the present invention especially concerns the detection of ultrasonic signals in an ambient sound environment. The desirability of these devices has been recently increasing due to the recognition that ultrasonic detectors may readily be implemented as leak detectors to detect ultrasonic signals which, for example, are created by the escape of pressurized gasses through small openings. This is useful, for example, in detecting leakage from pipelines as well as in detecting air flow paths, for example, through insulation of houses and commercial buildings and through automobile doors and panels. Other analytical values of such ultrasonic detectors are being discovered as well.

Two types of ultrasonic detectors currently dominate the market. A first type employs a crystal system to mechanically couple an ultrasonic input signal to a local oscillator in order to convert the frequency of the input ultrasonic signal to a resultant signal that has a frequency within the audible range. While being relatively inexpensive, crystal-based systems exhibit limited performance and have significant problems of sensitivity. These crystal-based systems are susceptible to noise, have problems with signal to noise ratio. In addition, though, crystal based systems are susceptible to mechanical vibrations and are susceptible to temperature changes which can effect their sensitivity and yield false readings. Further, crystal-based systems often and undesirably respond to infra-sonic and sonic signals that modulate the system so that again faulty readings occur. These crystal-based systems further usually have a very limited frequency range for target signals unless there is an ability to adjust the frequency of the local oscillator within the system.

A second system commonly used employs signal mixers that heterodyne a local oscillator with the input signal. Again, these systems are susceptible to noise, have problem with signal to noise ratio and have a limited frequency range unless the oscillator frequency can be adjusted. While these systems do not exhibit problems due to sonic or mechanical vibrations, they are nonetheless susceptible to temperature changes that can yield faulty readings. Further, systems that employ the heterodyne technique require multi-offset settings and are thus difficult to adjust and maintain over an extended period of use.

Accordingly, there remains a long felt need for a signal detector that is both sensitive in operation and which can operate to detect the large range of target frequencies. Further, there is a need for a signal detector and methodology which is less susceptible to mechanical vibration and temperature change. There is a further need for signal detectors and methodology that are more effective at filtering noise signals in order to get a cleaner target signal detection.

SUMMARY OF THE INVENTION

It is an object of the present invention to provide a new and useful signal detector and signal detection methodology for the detection of target signals over a wide target frequency range.

It is a further object of the present invention to provide a signal detector and detection methodology effective to detect target signals while eliminating low level noise even where such noise has frequency components within the target frequency range and to otherwise substantially eliminate entrained noise from a detected target signal.

Yet another object of the present invention is to provide a signal detector and detection methodology wherein a target signal, once present, is compressed to have an amplitude that is within a selected amplitude band in order to create a relatively noise free and stable signal after which the compressed target signal is frequency translated to another band and is amplitude modulated directly proportionally to the amplitude of the incoming signal so that the resultant output is a scale model amplitude replica of the original signal.

Still a further object of the present invention is to provide a signal detector that has reduced susceptibility to both mechanical vibration and temperature change.

Yet a further object of the present invention is to provide an inexpensive ultrasonic detector that is not modulated by sonic or sub-sonic signals and which is inexpensive to produce and yet which will display target signals both visually and audibly with the audible display portion being such that the frequency and amplitude of the ultrasonic signal is represented.

The present invention, therefore, is generally directed to a signal detector and a signal detection method for monitoring a range of oscillatory signals that define a signal universe in order to detect the presence therein of one or more target signals having a frequency characteristic within a selected frequency range. In its broad form, the signal detector includes an input processor that receives oscillatory signals and removes those oscillatory signals which do not have the frequency characteristics of the selected range and which produces an input signal corresponding to target signals within the selected frequency range. An amplifier then receives the input signal, either directly or after further processing and amplifies the input signal at a gain that increases proportionally to the increasing input amplitude of the original input signal in order to produce a detector output signal. Preferably, this signal detector includes an input signal cut-off that inhibits input signals which have an amplitude that is less than the selected threshold and further includes adjustment circuitry for adjusting the magnitude of amplitude of the input signal before being introduced into the amplifier. Where the input signal is further processed prior to being amplified, the signal detector includes means for splitting the input signal into a control signal that is operative to control the gain of the amplifier and into a primary input component. This detector then includes amplitude compressor means for establishing a ceiling amplitude for the primary input component and for compressing or clipping to said ceiling amplitude for all amplitudes of the primary input component that exceeds the ceiling. The resultant detector output signal can be displayed either visually, audibly or both.

In a more specific embodiment, the signal detector includes a first control circuit that is electrically coupled to the input signal and is operative to produce a first control signal proportionally to the amplitude of the input signal. Processing circuitry is provided to then receive the input signal and which in turn produces an intermediate signal having an intermediate frequency proportional to the frequency of the input signal. This processing circuitry includes a plurality of stages including a variable amplification circuit that converts the input signal in to an initial intermediate signal that has an intermediate frequency and a compressed, substantially uniform amplitude. The processing circuitry then converts this initial intermediate signal into a square-wave intermediate signal with the square-wave generator including frequency response circuitry so that the responsiveness of the square-wave generator is increased at higher frequencies. The square-wave signal may then be further processed by scaler circuitry to produce a scaled intermediate signal having a scaled frequency that is proportional to the frequency of the square-wave intermediate signal. The processing circuitry then includes an integrator which integrates the scaled intermediate signal to produce a resultant intermediate signal that provides an input for the first amplifier. This resultant intermediate signal is then amplified, as described above, at a gain that is proportional to the amplitude of the intial input signal. In the preferred embodiment of the present invention, the signal detector is directed to detection of ultrasonic signals which may be processed and scaled into an audible frequency.

In the broad form of methodology, the present invention provides an method for the detection of oscillatory signals and for producing an output corresponding to the presence of target signals within a selected frequency range. Broadly, this method includes a first step of receiving oscillatory signals and filtering those oscillatory signals to remove therefrom substantially all oscillatory signals which do not have a frequency within the selected frequency range and thereafter producing an input signal when at least one of the target signals is present. This input signal has an input amplitude and input frequency representative of the frequency and amplitude of all these selected signals which are then present. Next, the broad methodology produces a detector output by amplifying the input signal at an amplification gain that is a function of the input amplitude. This detector output signal is then displayed.

This broad method can include the step of deriving an intermediate signal from the input signal so that the step of amplifying the input signal is accomplished by amplifying the intermediate signal. The input signal may first be processed to block out all input signals having initial amplitudes which are smaller than a given threshold. Further, the input signal may be expanded and compressed according to the present methodology such that input signals having smaller initial amplitudes are amplified with higher gain and such that input signals having greater amplitudes are amplified with a lesser gain to produce an initial intermediate signal of substantially uniform amplitude. The initial intermediate signal may also be scaled to alter the frequency thereof and, preferably this by an intregal division of the frequency. The detector output is displayed either audible, visually, or both.

In a more specific form of the methodology according to the present invention, a method for monitoring ultrasonic sound signals is described. Here, the method indicates the presence of ultrasonic signals within a selected range, and includes a first step of receiving sound signals and producing a first electrical signal having a composite frequency and amplitude corresponding to the sound signals. Next, the first electrical signal is filtered to remove all components thereof which do not have a frequency within the selected frequency range so that an input signal is produced corresponding to all sound components having a frequency within the selected range. A primary input component and an input control components are then produced from the input signal. The primary input component is processed to produce an intermediate signal having an intermediate frequency that is scaled into an audible frequency range and which has a substantially uniform amplitude. The intermediate signal is amplified proportionally to the amplitude of the input control signal to produce a detector output signal as an amplitude modulated scaled replica of the input signal. Again, those primary input components which have amplitudes less than a selected threshold are inhibited and the primary input components are amplitude compressed as an initial intermediate signal having a frequency corresponding to the input signal and a substantially uniform amplitude. The initial intermediate signal is then translated into a square-wave signal, and, thereafter, the square-wave signal may be processed into a scaled signal having a frequency that is an intregal division of the frequency of the square-wave signal. The scaled signal may then be integrated into an integrated signal to define the intermediate signal. Again, the detector output may be displayed.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 12 shows a circuit diagram of the signal detector according to the preferred embodiment of the present invention implemented as an ultrasonic detector and includes FIG. 12(a) which is the input processing circuitry, FIG. 12(b) which is the intermediate processing circuitry, FIG. 12(c) which is the expander/modulator circuitry and FIG. 12(d) which is the power supply circuitry.

DETAILED DESCRIPTION OF THE EXEMPLARY EMBODIMENT

The present invention is directed to a signal detector and a signal detection methodology directed to monitoring a range of signals that define a signal universe in order to detect within that universe the presence of one or more target signals having frequency characteristics that are within a selected frequency range. It should be understood that the signal detector and method according to the present invention for purposes of an exemplary embodiment, are described with respect to an ultrasonic detector. However, it should further be appreciated and understood that the detector circuitry and methodology described herein has a broader application to the general monitoring of signals so that the techniques described herein can be employed by the ordinarily skilled person in the field to monitor other signals, for example, electromagnetic signals, as well as sound signals. Thus, virtually any type of detectable oscillatory signal to which a transducer may respond to produce an electrical signal can be monitored by the present system and method.

Figure 1A:
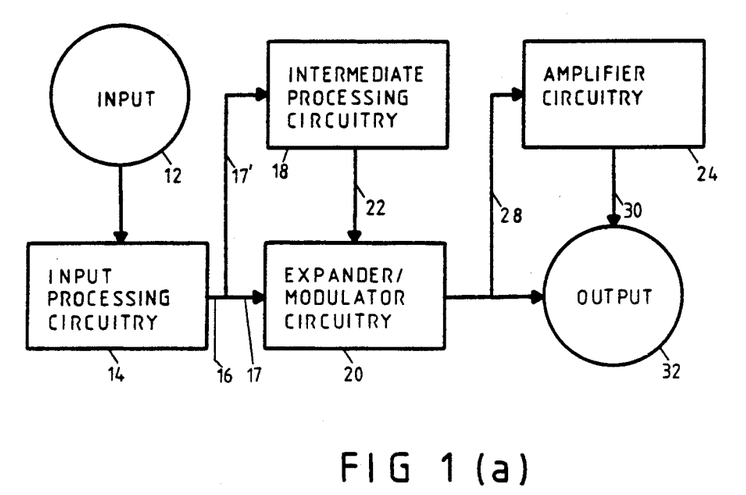
FIG. 1(a) is a block diagram showing, in simplified form, the general structure of the present invention.
Figure 1B:
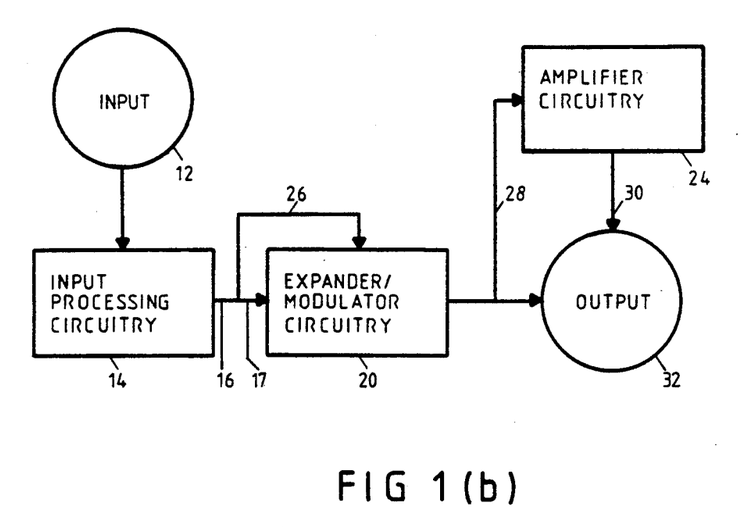
FIG. 1(b) shows a modification to the exemplary embodiment of FIG. 1(a) showing the general form of the present invention which eliminates the intermediate processing circuitry.
Figure 2:
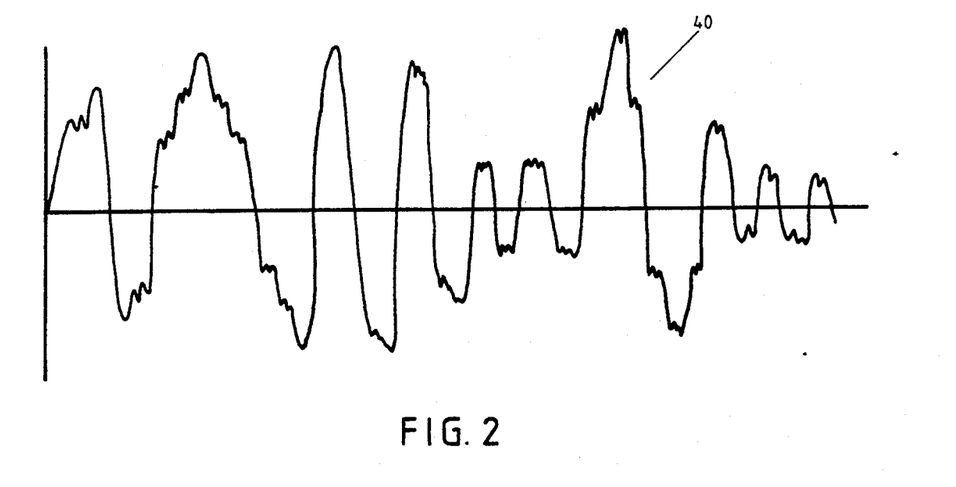
FIG. 2 is a graph of a mixed signal of the type monitored by the signal detector and methodology according to the present invention.
Figure 3:
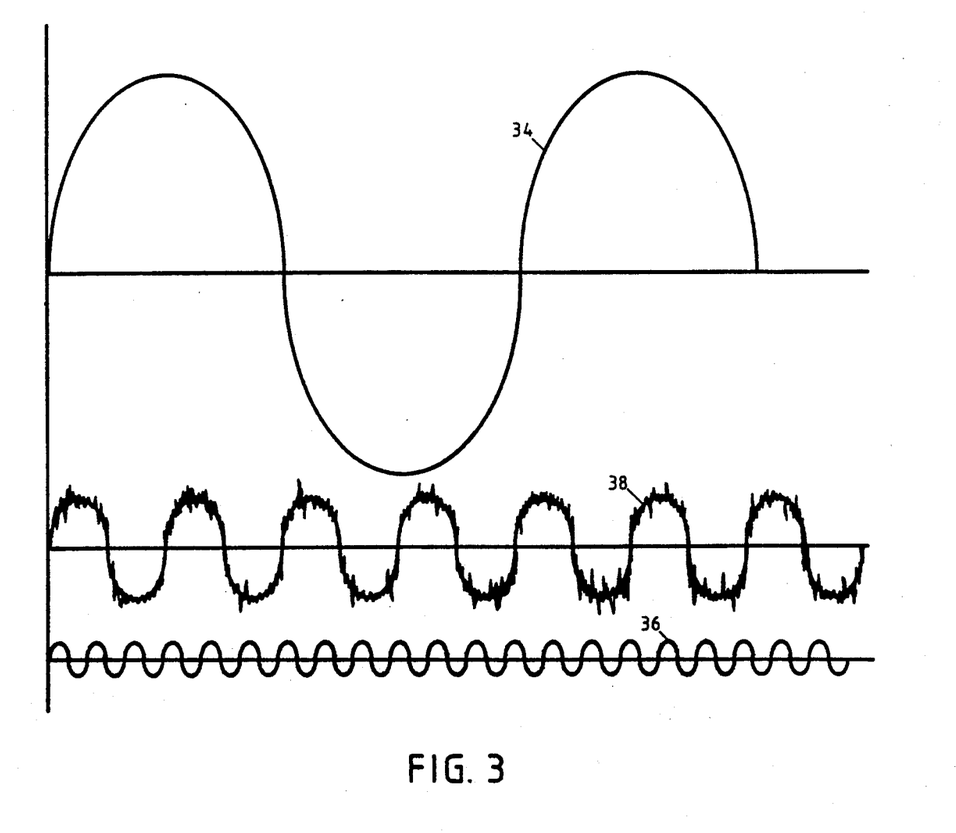
FIG. 3 shows representative individual signals which may be mixed to form a composite signal such as that shown in FIG. 2.

With respect to the exemplary embodiment, therefore, it may be seen with reference to FIG. 1(a) that signal detector 10, in its broadest form, is shown to include input processing circuitry 14 operated to receive oscillatory signals from input 12 to produce an input signal at 16 that is split into a control component 17 and a primary input component 17'. Input signal 16 is fed into both intermediate processing circuitry 18 and expander/modulator circuitry 20. Intermediate processing circuitry 18 produces a resultant intermediate signal 22 that is fed for amplification into expander/modulator circuitry and thereafter into amplifier circuitry 24. Alternately, FIG. 1(b) shows the most general form of the present invention wherein primary input component 17' is looped directly into expander/modulator circuitry 20 as is shown in at 26. Here, intermediate processing circuitry 18 is eliminated. However, it is far preferable, as described below, to process the primary input component 17' prior to amplification thereof. Expander/modulator circuitry 20 amplifies intermediate signal 22 directly proportionally to the amplitude of the input signal 16. That is, where input signal 16 has a low amplitude, the gain is low; whereas, when the amplitude of input signal 16 is high, the gain is also high. It is preferable but not required that this direct proportional relationship is a linear function. Detector output signal 28 may be displayed directly at output 32 and/or may be further amplified by amplifier circuitry 24 prior to display. It should be appreciated that input oscillatory signals which are fed into input processing circuitry 14 typically will be a mixed signal containing a variety of signal components of different frequencies and amplitudes. Thus, for example only, FIG. 3 shows three representative signals including a low frequency signal 34, a high frequency signal 36 and an intermediate frequency signal 38 which may be mixed together to form a mixed signal. A mixed signal 40 is shown in FIG. 2 as representative of the type of oscillatory signal received at input 12. It may be noted that the various oscillatory signals are typically corrupted with noise and that the resulting mixed signal 40 is likewise corrupted with noise components.

Figure 4:
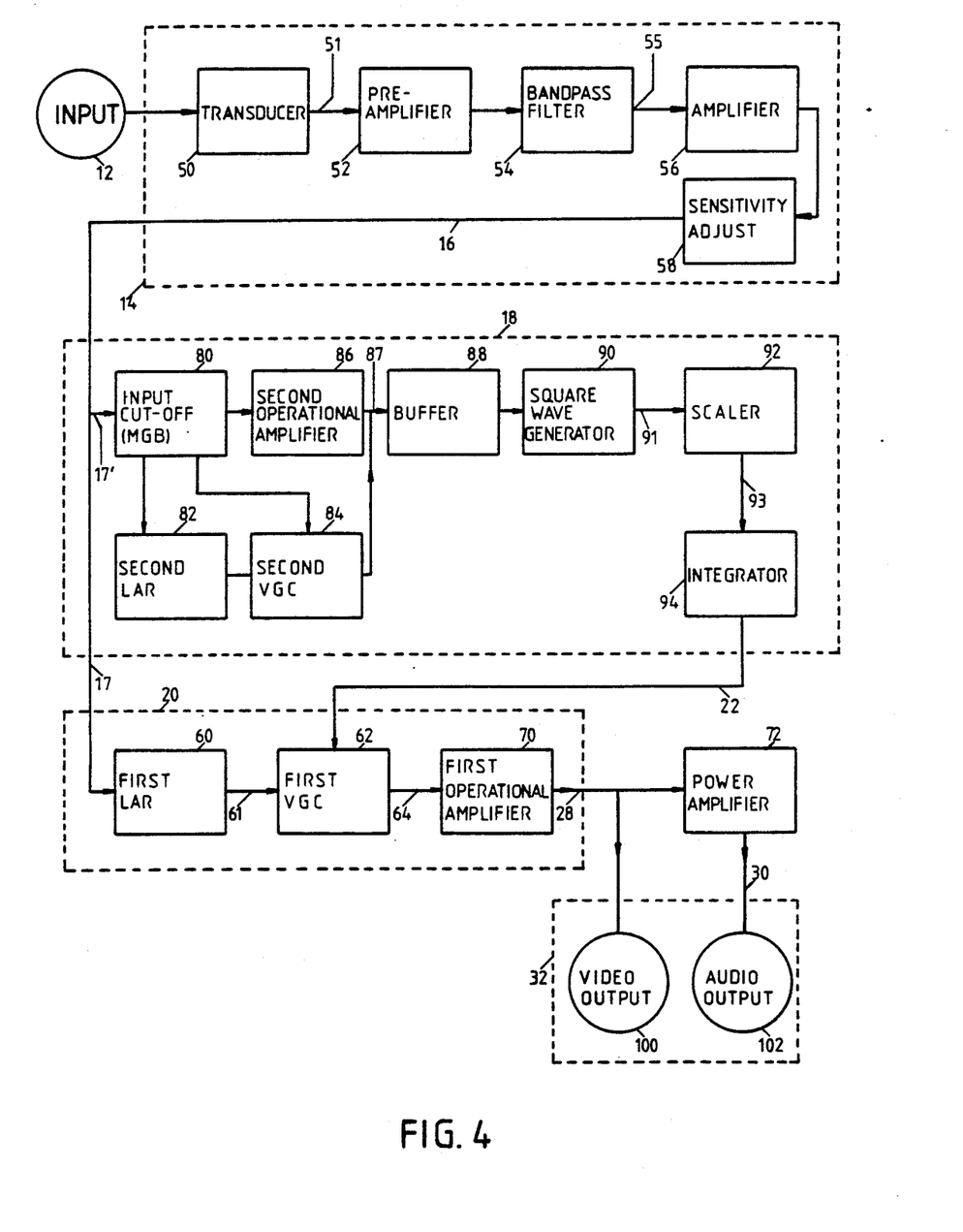
FIG. 4 is a block diagram showing a representative embodiment of an ultrasonic signal detector of the present invention implementing the exemplary methodology according to the present invention.

The exemplary embodiment of the signal detector according to the present invention may better be seen with reference to FIG. 4 which is a block diagram of the signal processing circuitry according to the present apparatus and which implements the preferred method of the present invention. Here, a universe of ambient signals is presented by input 12 and fed into input processing circuitry 14 to generate an input signal 16 as described above. Input processing circuitry 14 includes a transducer 50, a dual stage pre-amplification circuitry 52, bandpass filter circuitry 54, amplification circuitry 56 and sensitivity adjust circuitry 58. Transducer 50 may be a piezoelectric ultrasonic microphone or any other appropriate transducer operative to convert sound signals from input 12 into a transducer electrical signal 51 having a composite amplitude and frequency that corresponds to that of the sound signals from input 12, which, for explanatory purposes, is similar to FIG. 2. Bandpass filter 54 operates to establish a selected frequency characteristic in the form of a selected frequency window for target signals which are sought within input 12. Thus, components of the oscillatory signals from input 12 which do not have the frequency characteristic within the band of bandpass filter circuitry 54 are removed to produce a filtered signal 55 that is fed into amplifier 56. Thus, the resulting input signal 16 only has present therein target signals having the frequency within the range established by bandpass circuitry 54. It should be appreciated, though, that filter circuitry could be implemented which provides a threshold and/or a ceiling target frequency as opposed to both. Input signal 16, after being processed by sensitivity adjustment circuitry 58 has an input amplitude which is controllably adjusted by sensitivity adjustment circuitry 58 which may simply be a variable resistance, as described below.

Input signal 16 is split into two components. A control component 17 is electrically coupled to expander/-modulator circuitry 20 which includes a first linear averaging rectifier 60 which processes control component 17 into a first control signal 61 which controls the gain of a variable gain cell 62 having output 64 fed into first operational amplifier 70.

Primary input component 17' of input signal 16 defines the input for intermediate processing circuitry 18 that is processed thereby into resultant intermediate signal 22. More specifically, primary input component 17' enters intermediate processing circuitry 18 through input cut-off circuitry 80 which acts to inhibit all portions of primary input component 17' which have an amplitude less than established minimum threshold. Thus, only input signals having amplitude in excess of the threshold are allowed to be processed by intermediate processing circuitry 18. This accordingly acts to eliminate low level noise even where such noise has a frequency characteristic within the target frequency range.

Input cut-off circuitry 80 feeds a second linear averaging rectifier 82, a second variable gain cell 84 and a second operational amplifier 86. Rectifier 82, variable gain cell 84 and operational amplifier 86 act to establish a ceiling amplitude for an initial intermediate signal 87. To this end, linear averaging rectifier 82 converts the signal from input cut-off circuitry 80 into a DC current which varies linearly in magnitude as a function of the average value of the input signal. This DC current then controls variable gain cell 84, which may be a temperature compensated transconductance amplifier. As the DC current output of linear averaging rectifier 82 changes, the gain of the variable gain cell 84 changes. Thus, a high input signal from the linear averaging rectifier translates into a low impedance across the variable gain cell 84; likewise, a low input signal from the linear averaging rectifier translates into a high impedance across the variable gain cell. Accordingly, as the current from linear averaging rectifier 82 increases in a linear fashion, the feedback impedance across the variable gain cell reduces to cause operational amplifier 86 to reduce its gain. Similarly, as the input level is decreased the DC current from the linear averaging rectifier decreases at a linear fashion to increase the feedback impedance across the variable gain cell thus causing operational amplifier 86 to increase its gain. The result that initial intermediate signal 87, as described below, becomes a stable signal derived by having the input signal's low input amplitudes modified with higher gain than high input amplitudes. Therefore, the input signal is compressed within a selected amplitude band.

Initial intermediate signal 87 is then passed through buffer circuitry 88 which is a unity gain buffer in order to isolate operational amplifier 86 and the square wave generator 90. The output of buffer 88 is fed into the square-wave generator 90, which is preferably in the form of a modified Schmitt-Trigger that is modified as described more thoroughly below. The output of square-wave generator 90 is in the form of a square-wave signal 91 that is then processed by scaler circuitry 92 to produce a scaled signal 93 which has a frequency that is proportional to the frequency of primary input component 17' and thus proportional to the frequency of input signal 16. Preferably, scaler 92 acts to reduce the frequency of the intermediate square-wave signal by an intregal divisor. The scaled signal 93 is then integrated by integrator circuitry 94 which produces a triangle-wave signal as resultant intermediate signal 22 that has a substantially uniform amplitude and a frequency equal to the frequency of scaled signal 93.

Resultant intermediate signal 22 feeds expander/-modulator circuitry 20 so that it is amplified by first variable gain cell 62 and first operational amplifiers 70 a detector output signal 28. As noted above, the gain in amplification of intermediate signal 22 is controlled by control signal 61 generated by linear averaging rectifier 60. As the amplitude of input signal 16, and thus control component 17 increases, the DC output of linear averaging rectifier 60 increases. This increase is linear in magnitude as a function of the average value of that input signal. Variable gain cell 62 is again a temperature compensated transconductance amplifier so that signal 64 varies in amplitude proportionally to the average amplitude of the input signal 16. Thus, the intermediate signal 22 is a modulated manner directly proportionally to the average amplitude of input signal 16. Accordingly, the initial detector output signal 28 is amplitude modulated as a scaled replica of the original input signal; however, the resultant initial detector output signal 28 has been "cleaned" of noise and has been shifted in frequency. The initial detector output signal 28 may be displayed at video output 100 which, for example, may be a voltage meter. Initial detector output signal 28 can further be amplified by power amplifier 72 to form a final detector output signal 30 that can drive an audio output 102 which, for example, may be a set of earphones, a speaker, and the like.

Figure 5:
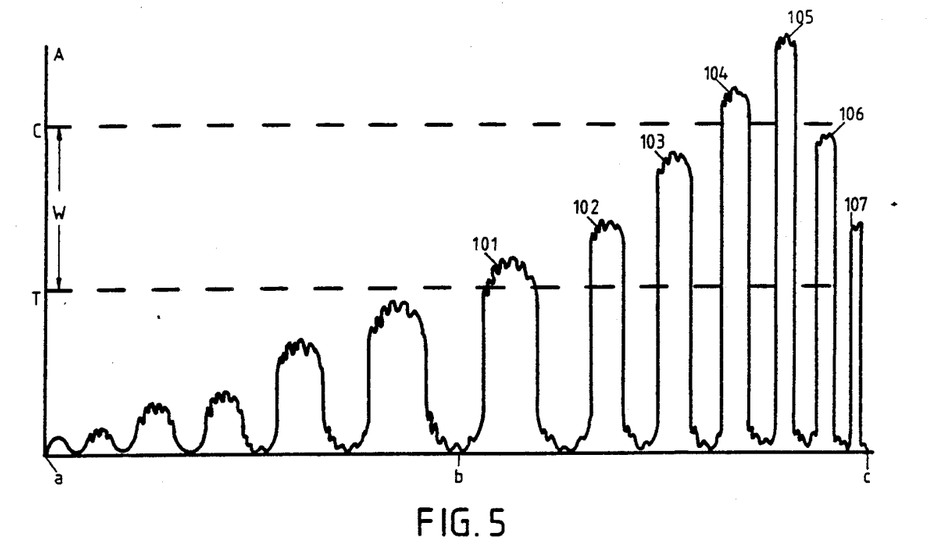
FIG. 5 is a graph showing a representative input signal to be processed by the present invention.
Figure 6:
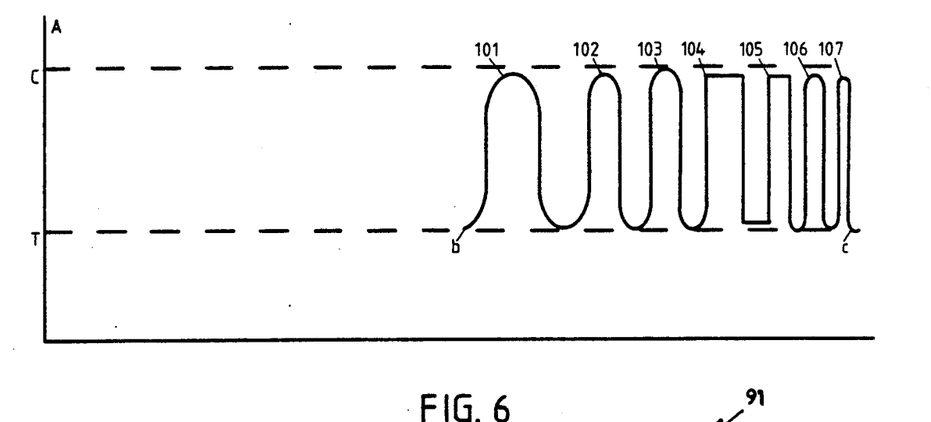
FIG. 6 is a graph showing an initial intermediate signal resulting from the processing of the signal shown in FIG. 5.
Figure 7:
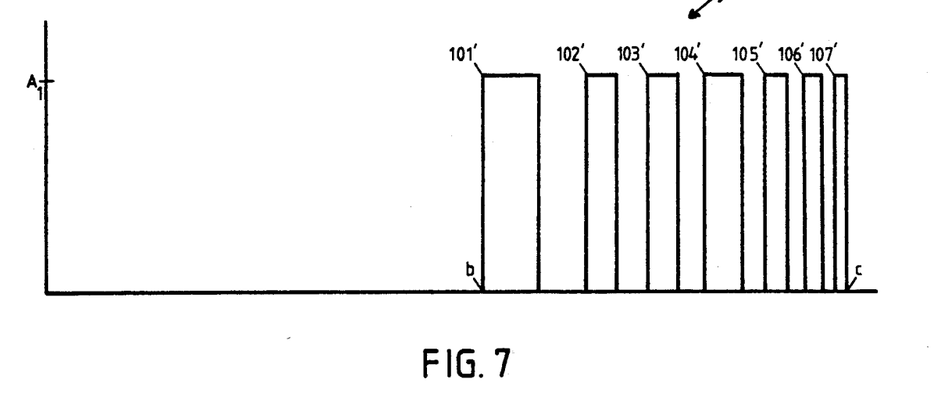
FIG. 7 is a graph showing a square-wave intermediate signal which results from the processing signal shown in FIG. 6.

An understanding of the shapes of the signals at different stages in processing can be further understood by the representative examples shown in FIGS. 5-11. In these Figures, it may be appreciated that FIG. 5 shows a representative input signal 16 which has a frequency within the selected frequency range passing through bandpass filter 54. Maximum gain block 80 provides the input cut-off to establish a threshold T so that signals within the range "a" to "b" are not amplified; likewise, signals within the range "c" to "d" are not amplified. For those signals in the range from "b" to "c" as is shown in FIG. 6, are amplified with a variable gain to expand the lower amplitude signals which are above threshold T such as components 101, 102, 103 and 107. For those components having amplitudes greater than ceiling C, such as components 104 and 105, such amplitudes are clipped, again as shown in FIG. 6. Thus, an initial intermediate signal is represented by FIG. 6 and this initial intermediate signal 87 is further processed by square-wave generator 90 to produce square-wave signal 91, as shown in FIG. 7. Here, the pulses of the signal in FIG. 6 are translated into a square-wave signal having a relatively uniform amplitude A, with the same frequency as the pulses of initial intermediate signal 87. Thus, square-wave signal 91 has pulse components 101'-107'.

Figure 8:
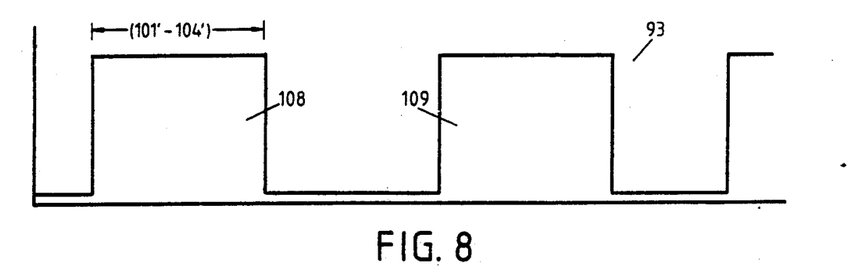
FIG. 8 is a graph showing a scaled intermediate signal corresponding to the signal of FIG. 7.
Figure 9:
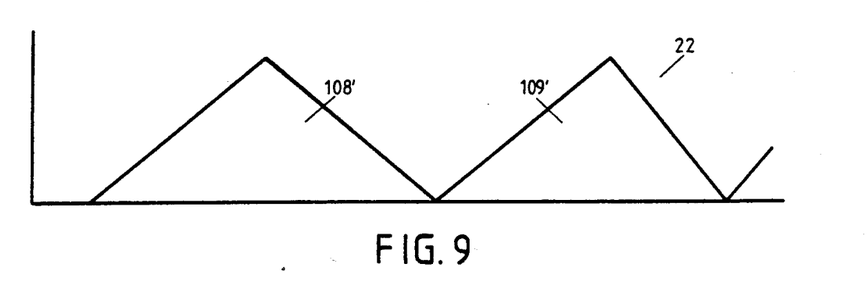
FIG. 9 is a graph showing a resultant intermediate signal after the processing of the signal shown in FIG. 8.

After square-wave signal 91 is produced, the scaler 92 further processes the square-wave signal to divide the frequency of the square-wave signal to a frequency within the audible range. Preferably, this division for the ultrasonic detector described by this invention is by an intregal factor of n=16, but it should be understood that other scalers including both divisors and multipliers, are within the scope of this invention. With respect to FIG. 8, however, a division of n=4 is shown for representative purposes; thus pulses 101'-104' create a single pulse 108. Assuming the signal pattern in FIGS. 5, 6, and 7, for a continuous wave train, FIG. 8 shows a plurality of pulses, such as pulses 108 and 109, which have a frequency that is an n=4 intregal division of square-wave pulse 91. This scaled pulse 93 is then intregated into integrated intermediate signal 22, as shown in FIG. 9. Here, integrator 94 takes each square-wave pulse to produce a triangular-wave pulse such as pulse 108' and 109'.

Figure 10:
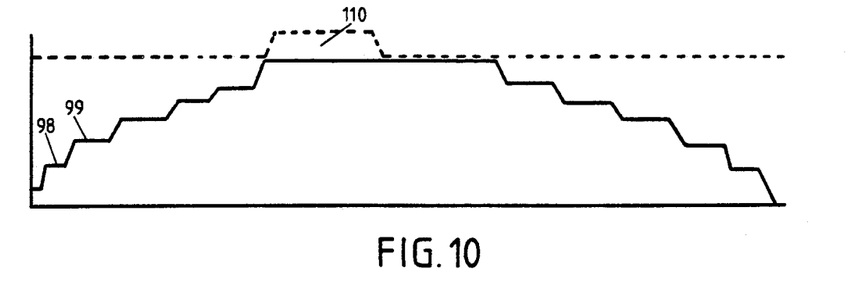
FIG. 10 is a graph showing the first control signal derived from the signal of FIG. 5 and operating on the resultant intermediate signal of FIG. 9.
Figure 11:
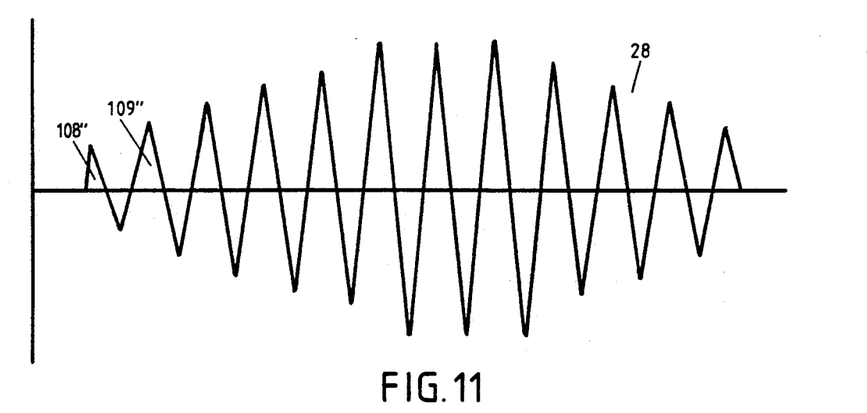
FIG. 11 is a graph showing a detector output signal resulting from the input signal shown in FIG. 5.
Figure 12A:
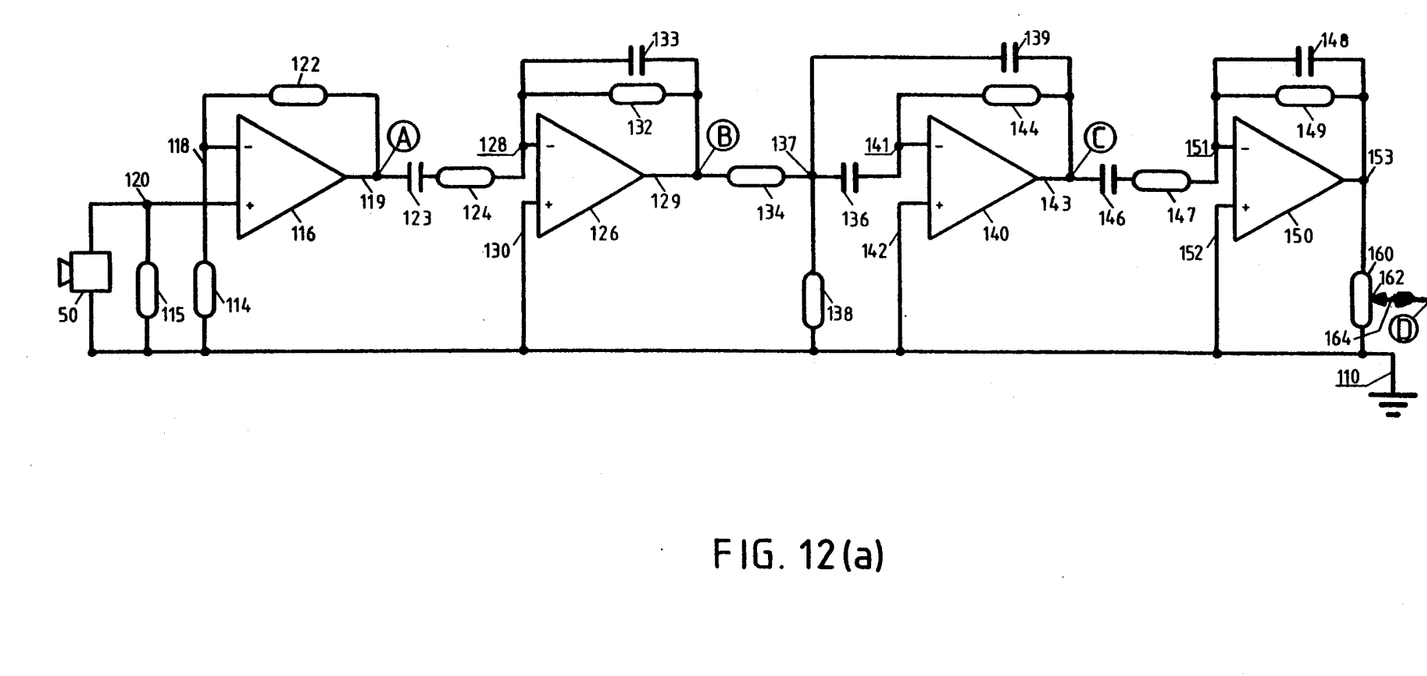
Figure 12B:
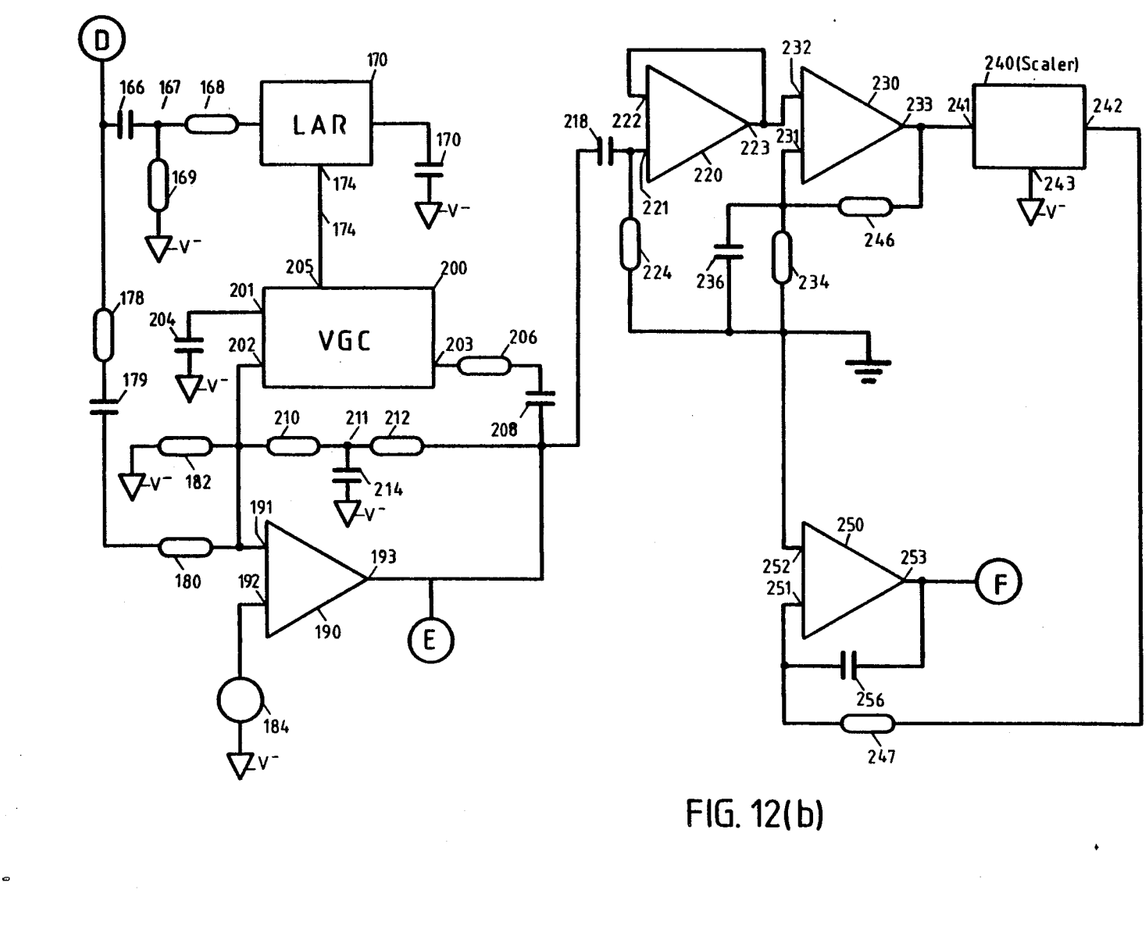
Figure 12C:
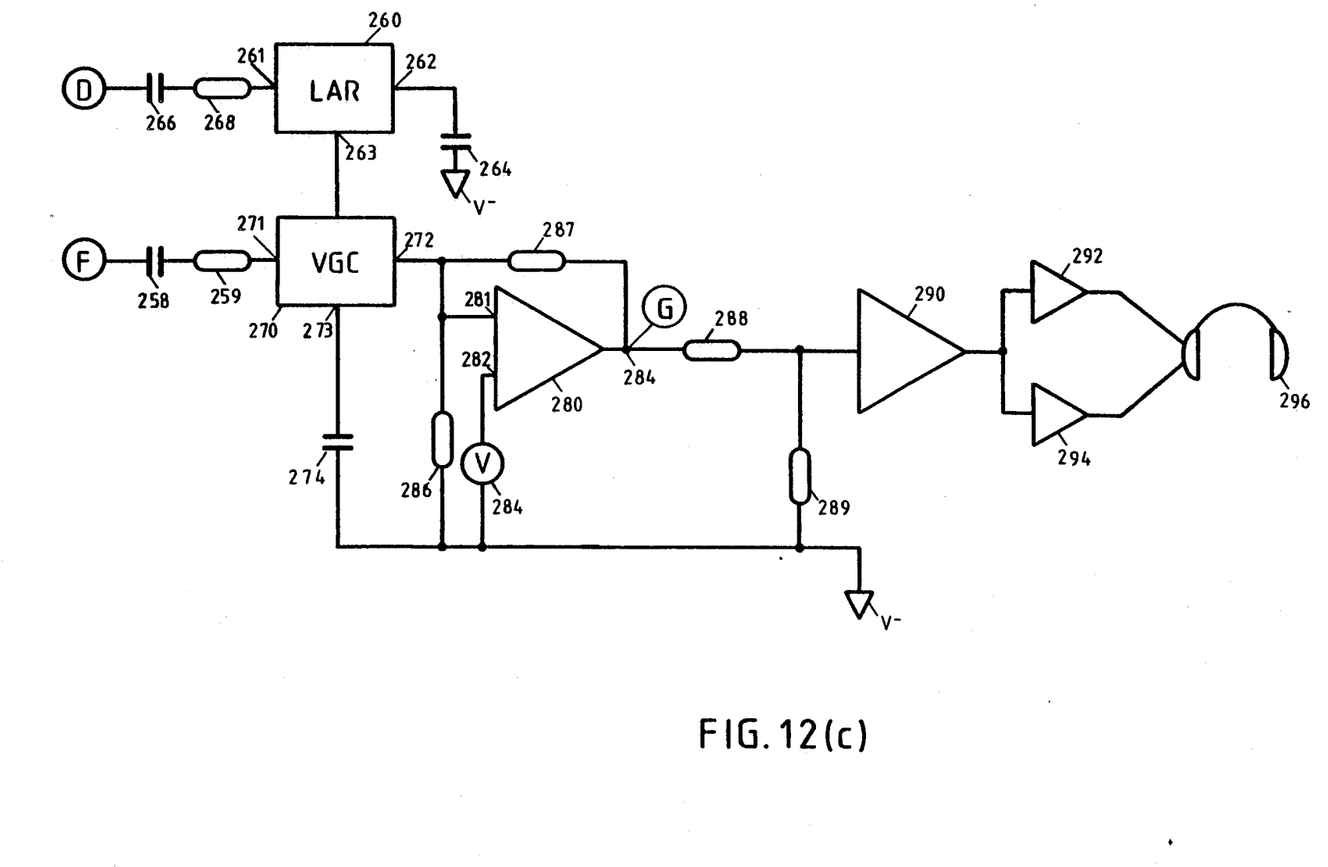
Figure 12D:
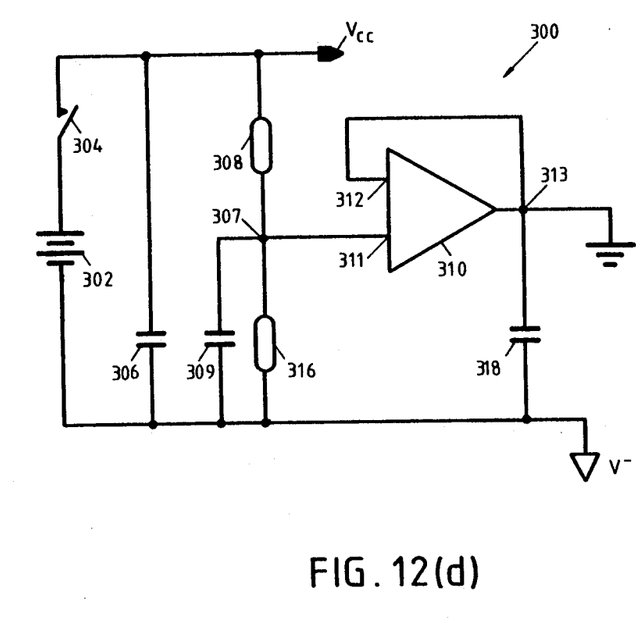

As noted above, intermediate signal 22 is then amplified in a variable manner according to the amplitude of the original input signal. Input control signal 17 is introduced through first linear averaging rectifier 60 and first variable gain cell in order to vary the gain of expander/modulator circuitry 20. FIG. 10 shows the gain level of expander/modulator circuitry 20 as a function of the input signal 16 so that it may be seen that the gain of the expander/modulator circuitry is a function of the amplitude of the signal shown in FIG. 5. Expander/modulator 20 has a maximum output level $G_1$ so that portions of the input signal that would generate a gain in excess of maximum output level G, such as that shown at 110, are clipped at gain G. The intermediate signal 22 from FIG. 9 is thus amplfied according to the corresponding gain shown in FIG. 10 gain for a series of pulses such as 108" and 109" and so on to produce an amplitude modulated signal that forms the scaled replica of the original signal. Thus, it may be seen that triangular-wave 108' is amplified by the corresponding gain at region 98 while pulse 109' is amplified by the corresponding gain at region 99. This continues for the stream of pulses to create, for example purposes only, the detector output signal 28 shown in FIG. 11. This signal may be audibly displayed to produce an audible signal having a tone that is proportional to the frequency of the ultrasonic sound signal received by transducer 50 and which has an amplitude that is a model of the amplitude of the original input signal. However, it is important to note that the intermediate processing circuitry has cleaned this signal and made it into an extremely stable signal for processing. Further, since the gain control has a maximum output level G, as shown in FIG. 10 the audible signal can not increase excessively so as to damage the human ears when the detector is being utilized. Further, a visual output, such as a voltage meter, a set of diodes, or the like, may be employed to register the varying amplitudes of the output signal 30.

FIG. 12 shows a circuit diagram of the exemplary embodiment of the present invention employed as an ultrasonic signal detector. As noted above, this but one possible implementation of the invention described herein and represents a particularly suitable adaptation of the signal detector and methodology described. In FIG. 12, then, piezoelectric transducer 50 is connected between ground 110 and input 120 of a first pre-amplifier 116. Input 118 of pre-amplifier 116 is connected to ground through a resistor 114 and input 120 of pre-amplifier 116 is connected to ground through resistor 115. Resistor 122 is connected in parallel to pre-amplifier 116 and therefore across input 118 and output 119 in order to set the gain of the pre-amplifier 116. Output 119 of pre-amplifier 116, at point A, feeds the input 128 of a second pre-amplifier 126 through a capacitor 123 and a resistor 124 connected in series with one another. Input 130 of pre-amplifier 126 is connected to ground. Resistor 132 and capacitor 133 are connected in parallel to one another across input 128 and output 129 of pre-amplifier 126 again to set gain. The result of connecting pre-amplifiers 116 and 126 in series as opposed to the utilization of a single pre-amplifier establishes a configuration operative to improve the signal to noise ratio of the pre-amplification of mixed composite signal 113 generated by transducer 112.

The signal existing pre-amplifier 126, at point B, is passed through an operational amplifier 140 which, with its associated components is configured as a bandpass filter. Specifically, the signal from pre-amplifier 126 is passed through resistor 134 and capacitor 136 which are connected in series with one another and then fed into input 141 of operational amplifier 140. Resistor 134 and capacitor 136 have a connecting point 137, and a resistor 138 interconnects point 137 to ground 110. Capacitor 139 is wired from point 137 to output 143 of pre-amplifier 140. A resistor 144 is connected across pre-amplifier 140 from input 141 to output 143. This configuration allows for the elimination of low frequency signals such as those which would be caused by infrasonic and sonic signals as well as mechanical vibrations of the device.

The resultant signal, at point C, is then capacitively coupled to a final pre-amplifier 150 by means of capacitor 146 and resistor 147 connected in series to one another to the input 151 of pre-amplifier 150. Input 152 of pre-amplifier 150 is connected to ground 110, and a capacitor 148 and a resistor 149 are connected in parallel to one another and across input 151 and output 153 of pre-amplifier 150 to set its gain. A variable resistor 160 interconnects output 153 of pre-amplifier 150 to ground 110 and includes a wiper arm 162 which carries the resultant input signal. Thus, variable resistor 160 defines a sensitivity adjustment for the system since it alters the amplitude of the input signal on electrical lead 164, at point D.

The input signal from point D is connected to the expander/modulator circuitry and to the intermediate processing circuitry. First, with respect to the intermediate processing circuitry, the input signal feeds a linear averaging rectifier 170 through a capacitor 166 and a resistor 168 connected in series with one another. Capacitor 166 is a coupling capacitor included to minimize DC off-set errors prior to inputting the signal to rectifier 170. Capacitor 166 and resistor 168 are connected together at point 167, and this point 167 is connected to negative rail V$^-$ through resistor 169 which forms part of the maximum gain block that sets a minimum amplitude threshold for a signal to be processed. That is, resistor 169 acts to bleed off any signal not having sufficient amplitude so that, unless some signal having minimum amplitude is present, there is no resultant signal for which rectifier 170 will average the amplitude thereof. Capacitor 172 acts as a damper on rectifier 170 by interconnecting rectifier 170 to ground. Thus, capacitor 172 sets the speed at which the output of linear averaging rectifier 170 changes at output 174 thereof. Lead 176 thus carries a gain control signal for variable gain control cell 200 whose operation is described below.

The input signal from point D is also fed to an operational amplifier 190 through resistor 178, capacitor 179 and resistor 180 connected in series with one another to the input 191 of amplifier 190. Resistor 178 acts also to set the minimum threshold for a signal to be processed so that, together with resistor 169, resistor 178 forms a maximum gain block for the intermediate processing circuitry. Capacitor 179 is, again, a coupling capacitor to minimize DC off-set errors for the input pre-amplifier 190. Input 191 of pre-amplifier 190 is connected to negative rail V− through resistor 182 and input 192 of operational amplifier 190 is connected to a reference voltage source 184.

Variable gain control cell 200 has an input 202 connected to input 191 of operational amplifier 190 so that variable gain control cell 200 also receives the signal from resistors 178, 180 and capacitor 179. Capacitor 204 is connected to terminal 201 of the variable gain control cell 200 and acts to bypass the variable gain control cell in order to correct for harmonic distortion. Output 203 of variable gain control cell 200 is then connected to output 193 of operational amplifier 190 through a resistor 206 and a capacitor 208 connected in series with one another. Capacitor 208 is again a coupling capacitor whose function minimizes DC off-set errors. Input 191 of operational amplifier 190 is connected to the output 193 of operational amplifier 190 through a pair of resistors 210 and 212 which are connected in series with one another at point 211, and a capacitor 214 interconnects point 211 to ground. The network composed of resistors 210, 212 and capacitor 214 set the DC output quiescent voltage level for the variable gain control cell 200 and the operational amplifier 190.

In operation, it should be appreciated that the output of linear averaging rectifier 170 is presented to input 205 of variable gain control cell 200 in order to vary the gain of operational amplifier 190. It may be seen from FIG. 12(b) that this control is not a closed loop system; thus, as the input level, that is the amplitude, of the input signal at point D increases, the current in rectifier 170 linearly increases to reduce the feedback impedance across variable gain control cell 200 thus causing the operational amplifier 190 to reduce its gain. A decrease in input amplitude decreases the current output of rectifier 170 thus causing an increase in the feedback impedance across variable gain control cell 200 which, in turn causes operational amplifier 190 to increase its gain. Thus, the input signal at point D results in an initial intermediate signal at point E that is compressed within an amplitude band. That is, where the amplitude is not sufficient to pass through the maximum gain block established by resistors 169 and 178, no signal is present at point E. On the other hand, the amplitude of signals having excessive amplitude is compressed and clipped by operational amplifier 190. This output is in the form, therefore, of a relatively stable, noise-free signal.

The initial intermediate signal present at point E is further processed by the intermediate processing circuitry. This initial intermediate signal is coupled to input 221 of unity gain buffer 220 through capacitor 218, and unity gain buffer 220 drives a modified Schmitt-Trigger 230. Input 221 of unit gain buffer 220 is connected to ground through resistor 224 and input 222 of unit gain buffer is directly connected to the output 223 thereof. Output 223 of buffer 220 is connected to input 232 of Schmitt-Trigger 230 while input 231 of Schmitt-Trigger 230 is connected to ground by means of a resistor 234 and a capacitor 236 connected in parallel to one another. Output 233 of the Schmitt-Trigger 230 is connected to input 231 thereof by resistor 246 and output 233 further clocks a scaler 240 at the input 241. The output of Schmitt-Trigger 230, at output 233, is a square-wave whose frequency is the frequency of the initial intermediate signal from location E. However, due to the modification of the classical Schmitt-Trigger achieved by connecting input 231 to ground through parallel resistor 234 and capacitor 236, the transfer function is changed from the simple equation:

$$H_o(s) = \frac{e_o}{e_1}(s) = \frac{R_1 + R_2}{R_1}$$

where:
s = Laplace transform variable
$e_o$ = Voltage at output 233
$e_1$ = Voltage at input 232
$R_1$ = Value of resistor 234
$R_2$ = Value of resistor 246
into the equation:

$$H_1(s) = \frac{R_1 + R_2(sR_1C_1)}{R_1}$$

where:
s = Laplace transform variable
$R_1$ = Value of resistor 234
$R_2$ = Value of resistor 246
$C_1$ = Value of capacitor 236

This modification transforms Schmitt-Trigger 230 into a frequency dependent Schmitt-Trigger such that the higher the frequency of the input signal, the more sensitive the circuit is and the faster the system changes states. Thus, as the frequency of the signal being input into the Schmitt-Trigger increases, the Schmitt-Trigger responds faster thereby enabling the modified Schmitt-Trigger to produce discreet pulses at higher frequencies.

Scaler 240 receives the square-wave signal from Schmitt-Trigger 230. Input 243 of scaler 240 is connected to negative rail V−. Scaler 240 divides the frequency of the square-wave signal to produce a scaled signal that is an integral division of the output of Schmitt-Trigger 230. In the exemplary embodiment, N=16 so that, for every sixteen pulses from the Schmitt-Trigger, a single pulse is produced by scaler 240. The scaled pulse from output 242 is then fed into integrator 250 by means of resistor 247. The signal is presented to input 251 of integrator 250 while input 252 is connected to ground. A capacitor 256 is connected across input 251 of integrator 250 and output 253 thereof. Integrator 250 thus acts to integrate the scaled square-wave pulse into a stable triangular wave. This triangular wave is in the form of a resultant intermediate signal at location F, and is fed into the expander/modulator circuitry 200.

Turning, then, to the expander/modulator circuitry, it may be seen that the original input signal, at location D, is fed into linear averaging rectifier 260 through a coupling capacitor 266 and a resistor 268 connected in series with one another. An output 262 of linear averaging rectifier 260 is connected to negative rail V− through capacitor 264, and the output at 263 of rectifier 260 is connected to variable gain control cell 270. Rectifier 260 generates a gain control signal, in the form of a DC voltage, which causes variable gain control cell 270 to vary its gain in accordance to the average amplitude of the initial input signal from location D. Output 273 of variable gain control cell 270 is connected to negative rail V− through capacitor 274.

As noted above, the resultant intermediate signal from location F is fed through coupling capacitor 258 and is inputted into variable gain control 270 through input 271. This feed is accomplished through a resistor 259 connected in series with capacitor 258. The output at output 272 of variable gain control cell 270 is provided to an operational amplifier 280 and, specifically, is inputted into the input 281 thereof. Input 282 of operational amplifier 280 is connected to reference voltage 284 while the output of 272 of variable gain control cell 270 is connected to negative rail V− through a resistor 286. Resistor 287 is connected across input 281 of operational amplifier 280 and output 284 thereof.

It should thus be appreciated that the resultant detector signal, at location G, is a scaled replica of the initial input signal having been "cleaned" and integrated by the intermediate processing signal. More particularly, it may be seen that the intermediate processing signal produces a very stable triangular wave as a resultant intermediate signal which has a frequency that is an integral division of the frequency of the original input signal that has been compressed and which has had various noise components removed. This stable triangular wave signal is amplitude modulated by the expander/modulator circuitry since the linear averaging rectifier 260 provides a modulating variable gain control signal for variable gain amplifier 270 so that the triangular wave amplitude varies as the average amplitude variation of the original input signal.

The detector output at location G can then be displayed in a variety of well known means. For example, this output can be coupled to a visual read-out in the form of a meter, such as shown in FIG. 4 but can also be power amplified by amplifiers 290, 292 and 294 which are connected to ear phones 296 to provide an audible output. The detector output signal from location G is fed first to amplifier 290 by means of resistor 288 with the input of power amplifier 290 being connected to ground through resistor 289. Amplifiers 292 and 294 provide power to the pair of speakers and earphones 296, as is well known in the art.

Power for the signal detector described above is provided by power supply 300 which preferable includes a power source in the form of battery 302 which may be turned on and off by switch 304. Capacitor 306 is connected in parallel with battery 302 and a resistor 308 connects the positive terminal of battery 302 to input 311 of unity gain buffer 310. Input 311 of unity gain buffer 310 is connected to the negative terminal of battery 302 through resistor 316. Input 312 of unitary gain buffer 310 is connected to output 313 thereof and to ground. Output 313 of operational amplifier 310 is also connected, through capacitor 318, to negative rail V− which may be seen to also be the negative terminal of battery 302. It may thus be seen that resistors 308 and 316 act as a voltage divides so that the negative battery terminal defines negative rail V− which the positive battery terminal defines $V_{cc}$. Further, division point 307, acting as the input to unity gain buffer 310, defines the ground. If desired, a battery monitor circuit (not shown) could be used to monitor battery 302 to warn the user of a low battery condition. These monitor circuits are of a type well known in the art.

From the foregoing description, it is believed that the construction of the present invention; should be readily understood by the ordinary circuit designer. To further explain this invention as implemented in the form of an ultrasonic detector, though, it is perhaps helpful to provide the following Table I which lists component values for the circuit shown in FIG. 12:

TABLE 1

| RESISTORS | | CAPACITORS | |
|---|---|---|---|
| Element # | Value (in ohms) | Element # | Value (in microfareds) |
| 114 | 1000 | 123 | 0.1 uF |
| 115 | 10K | 133 | 12 pF |
| 122 | 15K | 136 | 1 uF |
| 124 | 1000 | 139 | 1 uF |
| 132 | 75K | 146 | 0.1 uF |
| 134 | 10K | 148 | 100 pF |
| 138 | 270 | 166 | 0.1 uF |
| 144 | 39K | 172 | 0.1 uF |
| 147 | 1000 | 179 | 0.1 uF |
| 149 | 100K | 204 | 0.1 uF |
| 160 | 0-10K (variable) | 208 | 0.1 uF |
| 168 | 10K | 214 | 10 uF |
| 169 | 100K | 218 | 0.1 uF |
| 178 | 27K | 236 | 2.2 uF |
| 180 | 20K | 256 | 330 pF |
| 182 | 30K | 258 | 0.1 uF |
| 206 | 20K | 264 | 2.2 uF |
| 210 | 24K | 266 | 0.1 uF |
| 212 | 24K | 274 | 0.1 uF |
| 224 | 1000 | 306 | 22 uF |
| 234 | 1000 | 309 | 0.1 uF |
| 246 | 15K | 318 | 10 uF |
| 247 | 220K | | |
| 259 | 20K | | |
| 268 | 10K | | |
| 286 | 30K | | |
| 287 | 20K | | |
| 288 | 5600 | | |
| 289 | 51 | | |
| 308 | 100K | | |
| 316 | 100K | | |

Further, it should be understood that pre-amplifiers 120 and 126, bandpass filter 140 and pre-amplifier 150 are common circuits such as may be formed employing standard chip components. One example is a four stage LM837 integrated circuit chip; here, pre-amplifiers 120, 126, 150 and filter 140 are constructed from respective stages of the LM837 circuit chip. Similarly, Schmitt-Trigger 220, buffer 2330, integrator 250 and unity gain buffer 310 may be constructed by respective stages of a signal, four-stage LF444 integrated circuit chip. Scaler 240 may be constructed from a CD4060 integrated circuit ship. Amplifiers 290, 292 and 294 may be fabricated from a single TDA2052 integrated circuit chip. With respect to the linear averaging rectifiers 170, 260, the variable gain cells 200, 270 and operational amplifiers 190, 280, the same may be standard type sub-circuits such as those described, for example, in the *Linear Applications Handbook* (National Semiconductor Corp. 1980), the disclosures of which are incorporated herein by reference, all be understood by the ordinarily skilled circuit designer.

Based on the foregoing, it should be appreciated that the detector output, as presented by earphones 296 may present an audible signal that is a replica of the ultrasonic signals detected by transducer 250. Assuming an audible range of approximately 40-15,000 cycles per second, where scaler 240 divides the frequency by 16, ultrasonic signals having a frequency of up to approximately 240,000 cps can be heard by the user. The frequency of the tone heard by the user is a replica of the frequency of the ultrasound detected by transducer 250 so that, for higher pitches, the ultrasonic signal is of a higher frequency. The loudness of the tone indicates of the amplitude of the original ultrasonic signal although excessive amplitudes are suppressed by the processing circuitry and the variable gain. Where the device is used to detect gas leaks, this information allows the user, for example, to estimate the size of the leak by both as to geometric size and escaping gas.

Further, from the foregoing, it should be appreciated that the method according to the present invention may broadly be described to include certain processing steps. More particularly, the broad method of the present invention is directed to monitoring a universe of oscillatory signals and producing a detector output in response to the presence of one or more target signals having frequency characteristics within a selected frequency range. First, this method includes the step of receiving the oscillatory signals and then filtered them to remove substantially all oscillatory signals which do not have a frequency within the selected frequency range. An input signal is produced whenever at least one of the selected target signals is present within the received oscillatory signals; this input signal has an input amplitude and input frequency that is a composite of all target signals present within the monitored signals. The input signal is amplified at a gain to produce the detector output wherein the gain at the amplification gain of the input signal is adjustably varied as a function of the input amplitude. Finally, the detector output is displayed.

Preferably, this broad method includes the step of deriving an intermediate signal from the input signal such that the step of amplifying the input signal is accomplished by amplifying the intermediate signal. Further, the step of deriving the intermediate signal preferably includes the step of producing an initial intermediate signal that is compressed by amplifying smaller initial input amplitudes at a higher gain then greater initial input amplitudes. Further, it is preferred to scale the initial intermediate signal to alter the frequency thereof and to include the step of inhibiting amplification of input signals having amplitudes less than a selected threshold. The step of displaying the detector output can either be visual, audible or both.

In the exemplary form of the present invention, the preferred method is directed to the detection of ultrasonic signals which are present in a universe of sound signals. This method includes the first step of receiving the sound signals and producing, in response thereto, a first electrical signal having a composite frequency and amplitude corresponding to these sound signals being monitored. Next, this first electrical signal is filtered to remove all components thereof which do not have a frequency within the selected frequency range, and an input signal is produced corresponding to all sound components having a frequency within the selected frequency range which are present in the first electrical signal. Next, the method includes the step of deriving a primary input component and an input control component from the input signal. The primary input component is processed to produce an intermediate signal having an intermediate frequency that is scaled into an audible frequency range and which has a substantially uniform amplitude. The intermediate signal is then amplified proportional to the amplitude of the input control component of the input signal as an amplitude modulated scaled replica of the input signal.

This exemplary method may further include the step of inhibiting the processing of primary input components having amplitude less than a selected threshold and, if desired, the step of compressing the amplitude of the primary input components to produce an initial intermediate signal having a frequency corresponding to the input signal and a substantially uniform amplitude. The initial intermediate signal may be translated into a square-wave signal, and the square-wave signal may then be translated into a scaled signal having a frequency that is an intregal division of the frequency of the square-wave signal. Also, this method may include the step of integrating the scaled signal into an integrated signal defining the intermediate signal. Again, the detector output signal may be displayed either visually, audibly or both.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A signal detector for monitoring ultrasonic signals having an ultrasonic frequency within a selected frequency range and operative to produce a detector output in response thereto, comprising:

a transducer means for receiving sound signals and converting said sound signals into an electrical transducer signal;

a filter means for filtering said transducer signal to remove all frequency components thereof not within the selected frequency range to produce an input signal having an input signal frequency and an input signal amplitude;

processing circuit means responsive to said input signal for producing an intermediate signal having an intermediate signal frequency that is scaled from the input signal frequency into an audible frequency;

amplification control means responsive to said input signal for amplifying said intermediate signal proportionally to the input signal amplitude to produce a detector output signal; and means for displaying said detector output signal.

2. A signal detector according to claim 1 including a dual stage pre-amplifier means for amplifying said electrical transducer signal before supplying said electrical transducer signal to said filter means.

3. A signal detector according to claim 1 including sensitivity adjustments means for varying the amplitude of said input signal.

4. A signal detector according to claim 1 wherein said processing circuit means include input cut-off means for inhibiting processing of input signals having input amplitudes below a selected threshold value.

5. A signal detector according to claim 1 wherein said processing circuit means includes amplitude expansion and compression means for amplifying said input signal inversely proportionally to the input signal amplitude to produce an initial intermediate signal.

6. A signal detector according to claim 5 wherein said amplitude and compression means includes an operational amplifier operative to amplify said input signal, a linear averaging rectifier operative to produce an average value signal that varies linearly in magnitude as a function of the amplitude of said input signal, and a variable gain control cell operative in response to the average value signal to vary the gain of said operational amplifier inversely proportionally to the amplitude of said input signal to compress the amplitude thereof.

7. A signal detector according to claim 5 wherein said processing circuit means includes means to reduce harmonic distortion in said initial intermediate signal.

8. A signal detector according to claim 5 wherein said processing circuit means includes means for receiving said initial intermediate signal and generating a square-wave signal having the same frequency thereof.

9. A signal detector according to claim 8 wherein said means for generating said square-wave signal is a Schmitt-Trigger.

10. A signal detector according to claim 9 including frequency response circuitry associated with said Schmitt-Trigger whereby said Schmitt-Trigger has a response time that decreases with increasing frequency of the initial intermediate signal.

11. A signal detector according to claim 8 wherein said processing circuit means includes a scaler for receiving said square-wave signal and for producing a scaled signal having a scaled frequency that is an integral division of the initial intermediate signal frequency.

12. A signal detector according to claim 11 wherein said processing circuit means includes means for integrating said scaled signal into a triangular-wave signal defining said intermediate signal.

13. A signal detector according to claim 1 wherein said amplification control means includes a linear averaging rectifier operative to produce a control signal having a control amplitude that is proportional to an average of the amplitude of the input signal and a variable gain cell operative in response to the control signal to vary the amplitude of the intermediate signal proportionally to the control amplitude.

14. A signal detector according to claim 13 wherein said amplification control means include maximum output limit means for establishing an amplitude ceiling for said detector output signal.

15. A signal detector according to claim 1 wherein said means for displaying said detector output includes a visual display or an audible indicator.

16. A method for monitoring sound signals in order to indicate the presence of ultrasonic signals having a frequency within a selected frequency range, comprising the steps of:

receiving sound signals and producing in response thereto a first electrical signal having a composite frequency and amplitude corresponding to said sound signals;

filtering said first electrical signal to remove all components thereof which do not have a frequency within the selected frequency range and producing an input signal corresponding to all sound components having a frequency within said selected range;

deriving a primary input component and an input control component from said input signal;

processing said primary input component to produce an intermediate signal having an intermediate signal frequency that is scaled into an audible frequency range and which has a substantially uniform amplitude;

amplifying said intermediate signal proportionally to the amplitude of said input control component to produce a detector output signal as an amplitude modulated scaled replica of said input signal.

17. A method according to claim 16 including the step of inhibiting the processing of primary input components having amplitudes less than a selected threshold.

18. A method according to claim 16 including the step of compressing the amplitude of said primary input components to produce an initial intermediate signal having a frequency corresponding to the input signal and a substantially uniform amplitude.

19. A method according to claim 18 including the step of translating said initial intermediate signal into a square-wave signal.

20. A method according to claim 19 including the step of translating said square-wave signal into a scaled signal having a frequency that is an integral division of the frequency of said square-wave signal.

21. A method according to claim 20 including the step of integrating said scaled signal into a integrated signal defining said intermediate signal.

22. A method according to claim 16 including the step of displaying said detector output signal as audibly or visibly.

* * * * *